United States Patent [19]

Metcalf et al.

[11] Patent Number: 5,027,524
[45] Date of Patent: Jul. 2, 1991

[54] MOTORCYCLE AND ATV SUSPENSION GAUGE

[76] Inventors: Eric S. Metcalf, 1900 Palomino La., Gardnerville, Nev. 89410; Anthony Campbell, 663 Old Mammoth Rd., Mammoth Lakes, Calif. 93546

[21] Appl. No.: 499,087

[22] Filed: Mar. 26, 1990

[51] Int. Cl.$^5$ ............................................. G01B 5/14
[52] U.S. Cl. ........................................ 33/600; 33/809; 33/203.18; 33/608
[58] Field of Search ............ 33/600, 608, 809, 203.18, 33/612, 288

[56] References Cited

U.S. PATENT DOCUMENTS

| | | | |
|---|---|---|---|
| 1,903,051 | 3/1933 | Kennedy | 33/203.19 |
| 3,487,551 | 1/1970 | Eggert et al. | 33/203.18 X |
| 4,407,073 | 10/1983 | Nilsson et al. | 33/203.18 |
| 4,416,064 | 11/1983 | Hurst | 33/612 |

FOREIGN PATENT DOCUMENTS 5410  7/1892  Switzerland .......................... 33/809

OTHER PUBLICATIONS

1989/90 Honda Motor Co. Ltd., Owners Manual and Competition Handbook CR250R, pp. 38 & 39.

Primary Examiner—Harry N. Haroian

[57] ABSTRACT

A suspension gauge with an inner rod (12) sliding in an outer tube (10). The marker ring (18) slides along the calibrated scale of the inner rod marking the deflection of the suspension system at various loaded and unloaded positions. In addition a locking mechanism (16)(24)(26)(28)(30)(32)(34)(36)(38) is provided at the lower end of the gauge as an attachment device to the rear axle hub. At the upper end of the gauge a swivel block (22) and spring clip (14) are provided to attach the gauge to the motorcycle rear fender.

4 Claims, 4 Drawing Sheets

MOTORCYCLE AND ATV SUSPENSION GAUGE

BACKGROUND

1. Field Of Invention

This invention relates to the measurement of motorcycle and ATV (All Terrain Vehicle) suspension system deflections in various loaded and unloaded positions.

2. Description Of Prior Art

It is important that the deflection of a motorcycle or ATV suspension system be measurable by the rider with a fair degree of accuracy. This is especially significant for off-road vehicles used on all types of terrain and for racing motorcycles or ATV's on prepared tracks.

The method commonly used to measure these deflections involves the use of a tape measure, the rider, and the cooperation of two assistants. Up to the present the procedure has been as follows:

(1) With the motorcycle or ATV supported on a workstand and the rear wheel completely off the ground, measure the distance between the rear fender mounting bolt and the center of the rear axle using a tape measure. This is the reference measurement with the suspension system completely unloaded.

(2) The motorcycle is now removed from the workstand and the rider mounts the vehicle placing his feet on the pegs. This deflects the motorcycle suspension system to the fully loaded position. During this procedure number one assistant must steady the vehicle to prevent it from falling sideways.

(3) In this fully loaded position number two assistant now measures the distance between the rear fender mounting bolt and the center of the rear axle, using the same tape measure.

(4) The fully loaded measurement taken in step 3 must now be subtracted from the unloaded measurement taken in step 1. This difference in deflection is commonly referred to as the race sag.

(5) The motorcycle or ATV is now held upright in the normal position with the rear wheel resting on the ground, without the rider's weight. The rider or one of his assistants now measures the distance between the rear fender mounting bolt and the center of the rear axle.

(6) The measurement taken in step 5 must now be subtracted from the measurement taken in step 1 to determine the sag due to the weight of the sprung portion of the motorcycle or ATV alone.

The above measurement procedure utilizing the rider and two assistants is clumsy, time consuming, prone to miscalculation, and subject to inaccuracies in measurement.

All owners manuals and competition handbooks recommend this method of suspension measurement as is evident from the 1990 Honda CR250R owners manual and competition handbook.

OBJECTS & ADVANTAGES

To overcome the disadvantages of previous existing methods, our design presents the following objects and advantages.

(A) To provide the rider with a simple suspension gauge which can be easily attached by one person to both the rear fender and to the rear axle hub of the motorcycle.

(B) To provide a graduated measurement scale and sliding marker which allows the rider to quickly and easily take measurements, in various loaded and unloaded position, without the use of assistants.

(C) To provide a single sliding action of the gauge and marker such that the deflection measurement is less prone to human error and miscalculation.

(D) To provide a method which allows the rider to take positive readings with an accuracy that is much greater than any existing method. Still further objects and advantages will become apparent from a consideration of the ensuing description and drawings.

DRAWING FIGURES

In the drawings each figure is shown on a separate sheet for clarity and simplicity.

REFERENCE NUMERALS IN DRAWINGS

10 Outer Tube
12 Inner Rod
14 Spring Clip
16 Mounting Block
18 Marker Ring
20 Dowel Pin
22 Upper Swivel Block
24 Lower Swivel Block
26 Thumbscrew
28 Inner Flexor
30 Locking Screw
32 Expansion Cone
34 Outer Flexor
36 Lock Ring
38 Circlip

DESCRIPTION FIGS. 1-4

Figure 1:
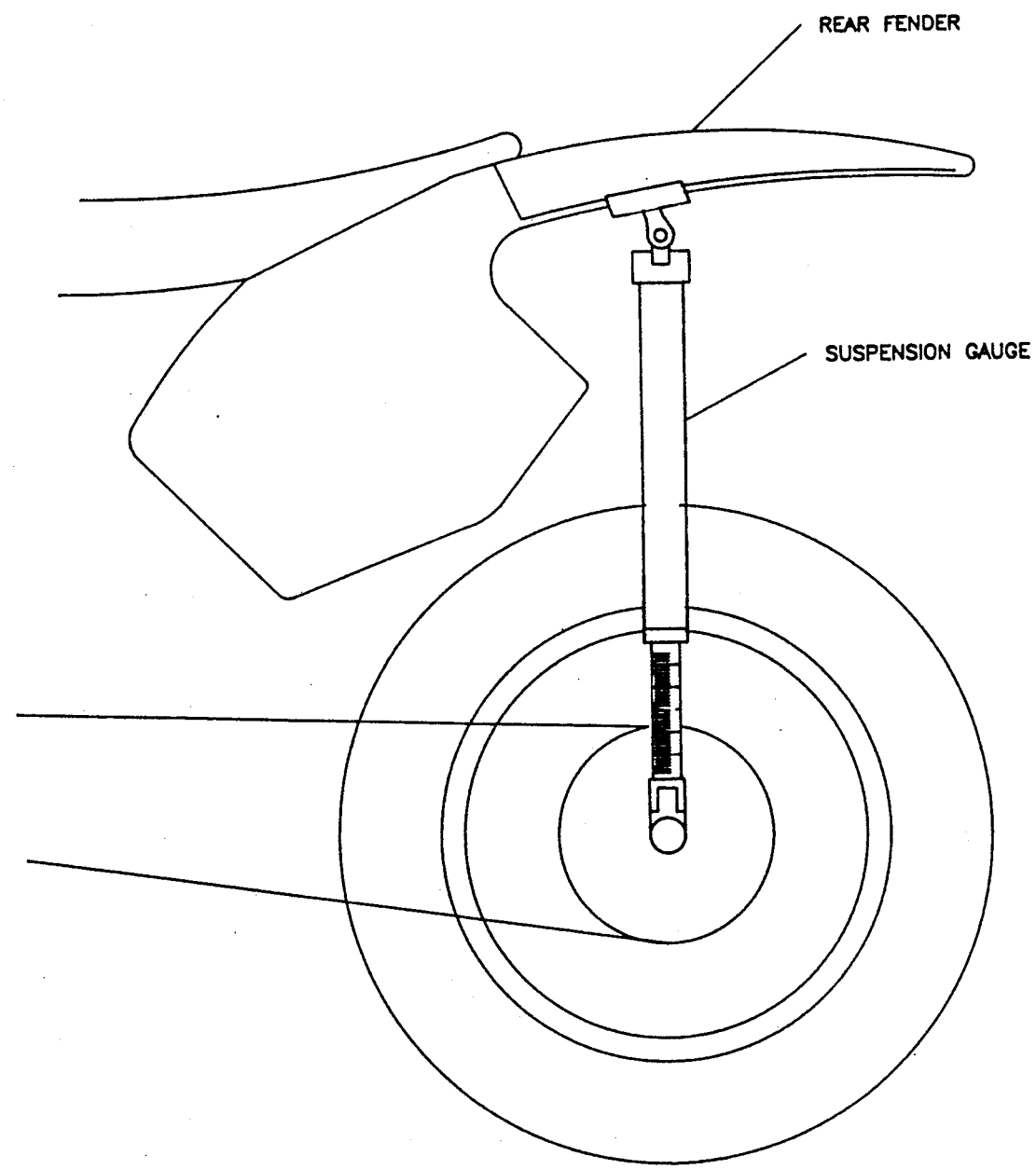
FIG. 1 Shows the suspension gauge in position on the motorcycle ready for measurements to be taken.

A typical application of the invention is illustrated in FIG. 1 where the suspension gauge is shown attached at one end to the rear fender of the motorcycle with the other end attached to the rear axle hub.

Figure 2:
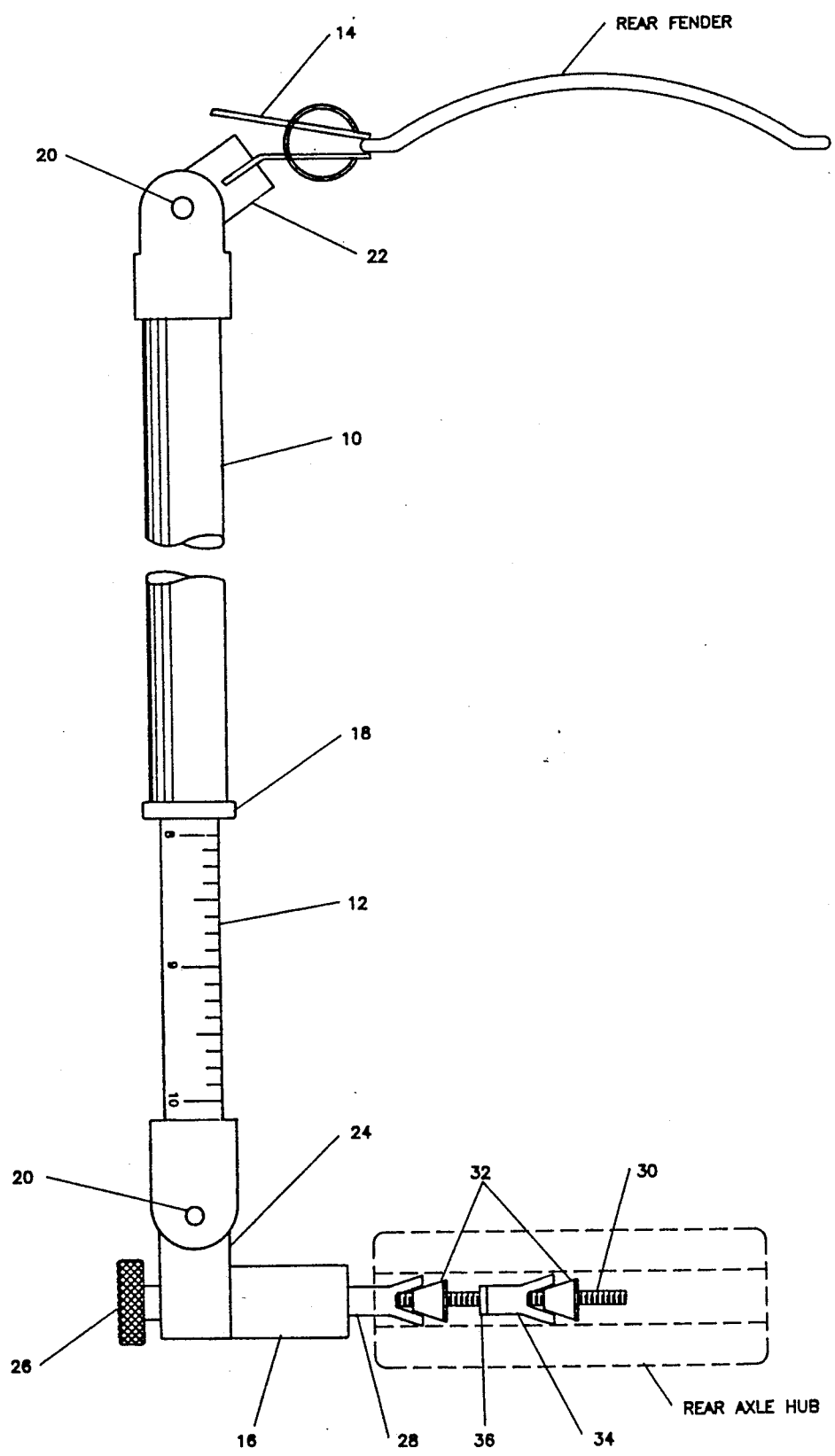
FIG. 2 Shows the suspension gauge completely assembled, and demonstrates the method of attachment to both the rear fender and the rear axle hub of the motorcycle.

The complete assembly and operating details of the suspension gauge is shown in FIG. 2. The inner rod 12 is a sliding fit in the outer tube 10. The marker ring 18 is made of flexible material and is a sliding fit on the inner rod 12.

Figure 3:
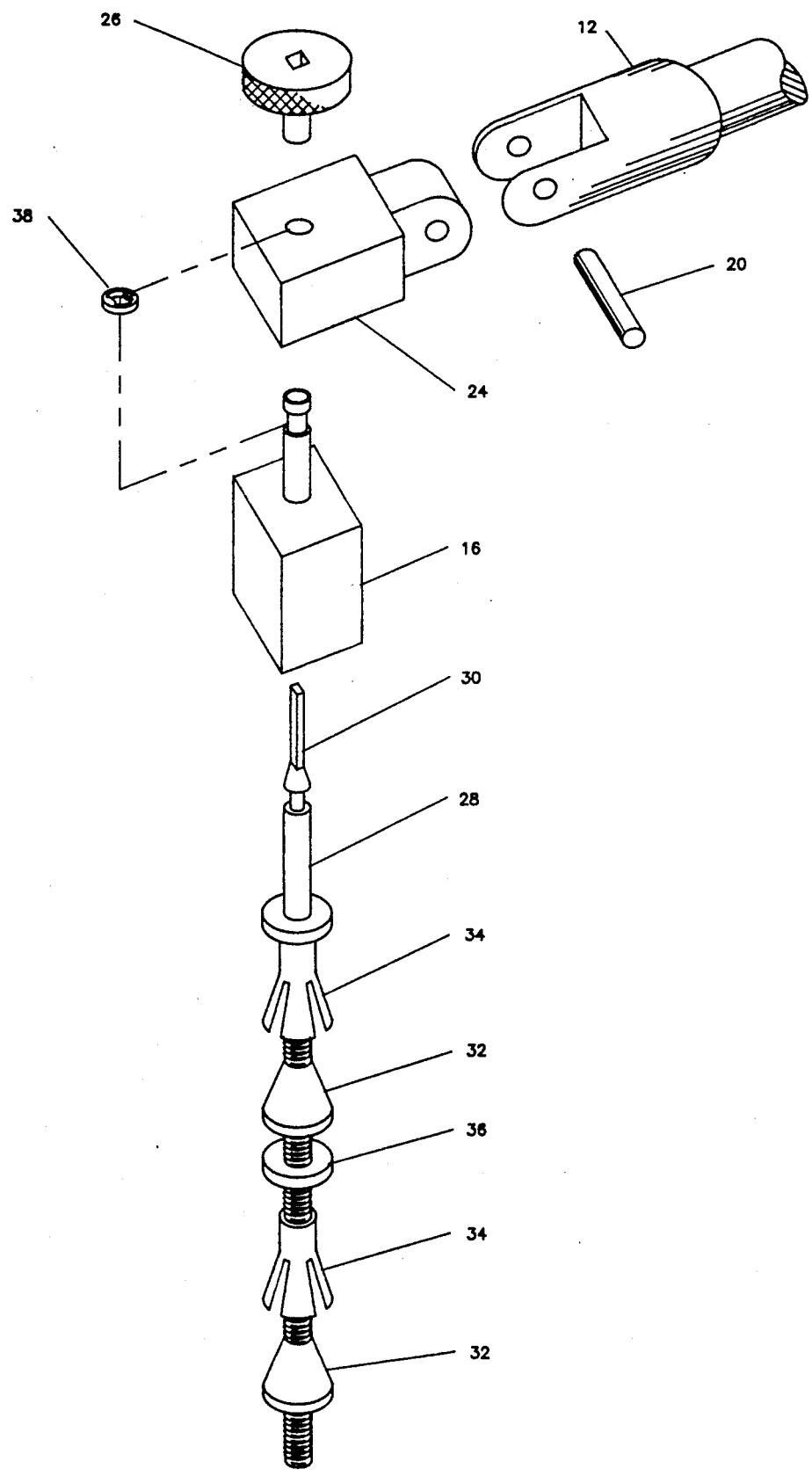
FIG. 3 Shows details of the lower end of the gauge and the expandable device which locks it in place to the rear axle hub.

The details of the lower attachment to the rear axle hub are shown in FIG. 3. The locking screw 30 has a squared shaft which is capable of being rotated by thumbscrew 26 the shaft of the thumbscrew 26 passes through the hole in the lower swivel block 24 slides into the hole in mounting block 16, and engages the square shaft of locking screw 30.

The circlip 38 fastens the mounting block 16 to the lower swivel block 24 but allows the mounting block 16 to rotate if necessary.

The thumbscrew 26 when rotated, also rotates the locking screw 30 which causes the expansion cones 32 to move along the threaded portion of the locking screw 30. As the expansion cones 32 move along the locking screw 30 they engage the split leaves of the inner flexor 28 and the outer flexor 34 causing them to expand. This expansion locks the lower end of the suspension gauge into the rear axle hub of the motorcycle as shown in FIG. 2.

Figure 4:
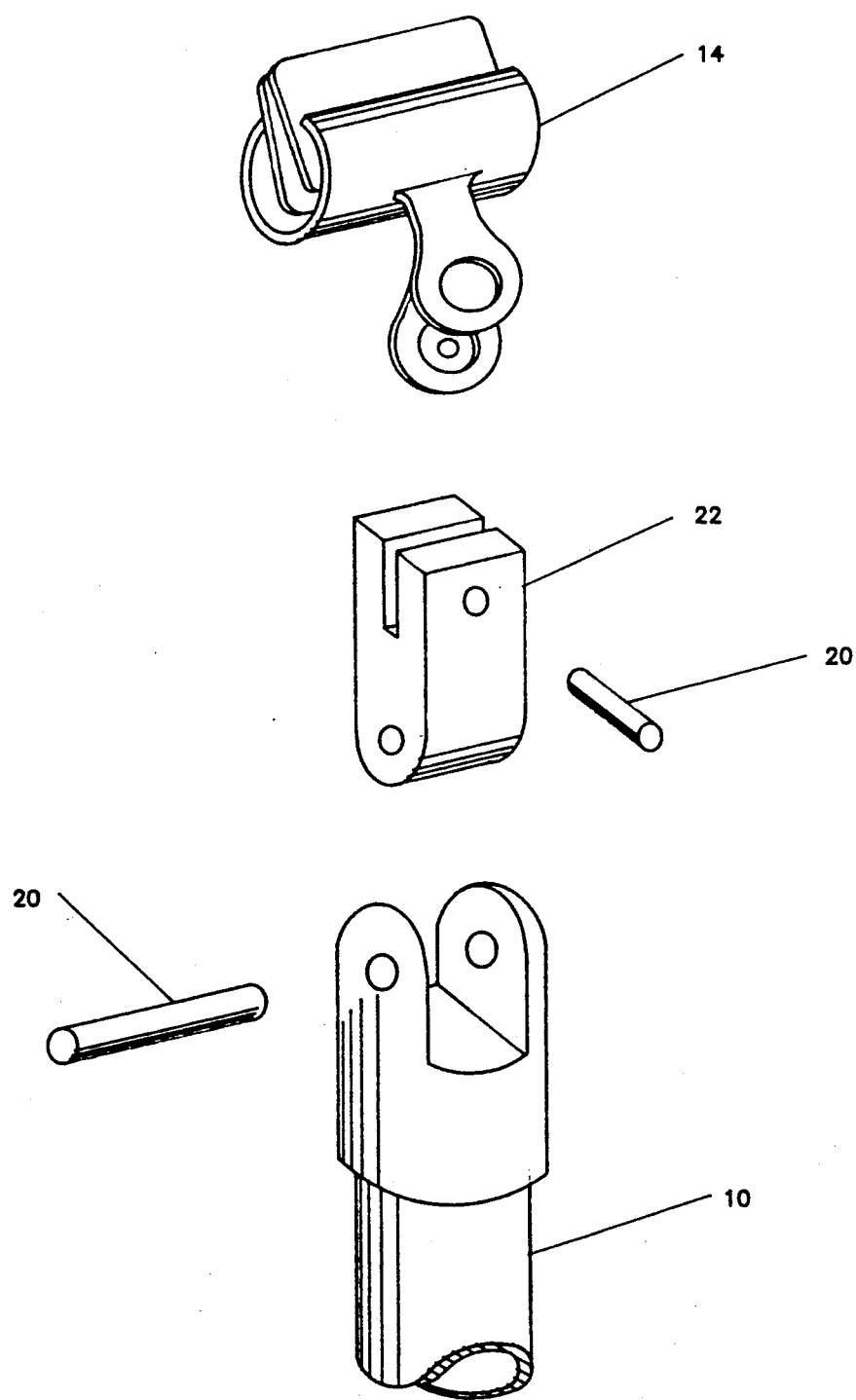
FIG. 4 Shows details of the upper portion of the gauge with the adjustable spring clip device used to attach the gauge to the rear fender.

The details of the upper attachment device are shown in FIG. 4. The upper swivel block 22 is attached to a slot in the outer tube 10 with a dowel pin 20. One arm of the spring clip 14 is attached to a slot in the upper swivel block 22. The other arm of the spring clip 14 is free such that the spring clip can be easily opened and closed by the operator.

This method of slotting each component and fastening with dowel pins, together with the inner rod 12 being free to rotate in the outer tube 10 provides three degrees of freedom of movement for the upper attachment device so that it can be attached to any type of rear fender design.

Operation FIGS. 1 & 2

The first step in attaching the suspension gauge to the motorcycle is to rotate the thumbscrew 26 in a counter clockwise direction until the outer flexor 34 and the inner flexor 28 slide easily into the hole in the rear axle hub as shown in FIG. 2.

Now rotate the thumbscrew 26 in a clockwise direction until both the inner flexor 28 and the outer flexor 34 lock up in a tight and secure manner in the rear axle hub.

Adjust the angle and rotation of the spring clip 14, at the upper end of the suspension gauge, to match the contour of the motorcycle rear fender and attach the spring clip 14 tightly to the rear fender.

The suspension gauge is now in position for measurements to be taken.

(1) Support the motorcycle or ATV on a workstand with the rear wheel off the ground, and without the rider's weight. The suspension system is now in the completely unloaded position. Note the position of the marker ring 18 relative to the graduated scale on the inner rod 12.

(2) Remove the motorcycle or ATV from the work stand and place it in the normal riding position with the rear wheel resting on the ground without the riders weight. This allows the suspension system to deflect under the sprung weight of the motorcycle or ATV alone.

As the suspension deflects, the inner rod of the gauge 12 slides within the outer tube 10, moving the marker ring 18 along the graduated scale of the inner rod 12. Note the new position of the marker ring 18 on the graduated scale.

(3) The rider now mounts the motorcycle, ATV and balances briefly with his feet on the pegs. This allows the rear suspension system to deflect to the fully loaded position. The marker ring 18 slides farther down the graduated scale on the inner rod 12. Note the final position of the marker ring 18 on the graduated scale.

The difference between the positions of the marker ring 18 in steps 1 and 2 can be read off the graduated scale. This difference gives the suspension sag due to the motorcycle, ATV sprung weight alone. The difference in the position of the marker ring 18 between steps 1 and 3 gives the total race sag deflection from the fully unloaded to the fully loaded position.

The above procedure can be performed quickly and accurately by a single operator using the motorcycle, ATV suspension gauge as described.

SUMMARY RAMIFICATIONS AND SCOPE

Accordingly the reader will see that this invention provides the rider with a simple and accurate method of measuring the deflection of motercycle, ATV suspension systems. Furthermore this invention has additional advantages in that:

*It provides the rider with an effective suspension gauge that can be easily attached to the rear fender and to the rear axle hub of the motorcycle, ATV.

*The graduated scale and sliding, marker provides the rider with a means of quickly and easily taking measurements in various loaded and unloaded positions without the use of assistants.

*It provides a method of taking suspension deflection measurements that is less prone too human error and miscalculation than any previous method.

*It provides a positive procedure of taking measurements with an accuracy that is greater than any existing method.

Although the description above contains many specifics these should not be construed as limiting the scope of the invention but as merely providing illustrations of some of the presently preferred embodiments of this invention.

For example the method of attachment to the fender and the rear axle hub could be modified for different types of motorcycles and ATVs. The suspension gauge could be adapted for use on motorcycle front suspension systems, and could be further modified for use on different types of vehicles.

Thus the scope of the invention should be determined by the appended cliams and their legal equivalents rather than by the examples given.

We claim:

1. A motorcycle, ATV suspension gauge for measuring the deflection of rear and front suspension systems comprises a tube, a calibrated rod slidable in said tube, a marker ring slidingly and frictionally mounted on said rod to mark suspension deflection in various loaded and unloaded positions, means on the free ends of said tube and said rod for attaching the gauge to a rear fender and a rear axle hub.

2. The suspension gauge of claims 1 wherein said rod is made of a plastic material.

3. The suspension gauge of claim 1 wherein said tube is made of a plastic material.

4. The suspension gauge of claim 1 wherein the marker ring is made of a flexible rubber material.

* * * * *